H. KLENERT.
HORSE FEED BAG.
APPLICATION FILED DEC. 23, 1912.
1,064,745.
Patented June 17, 1913.
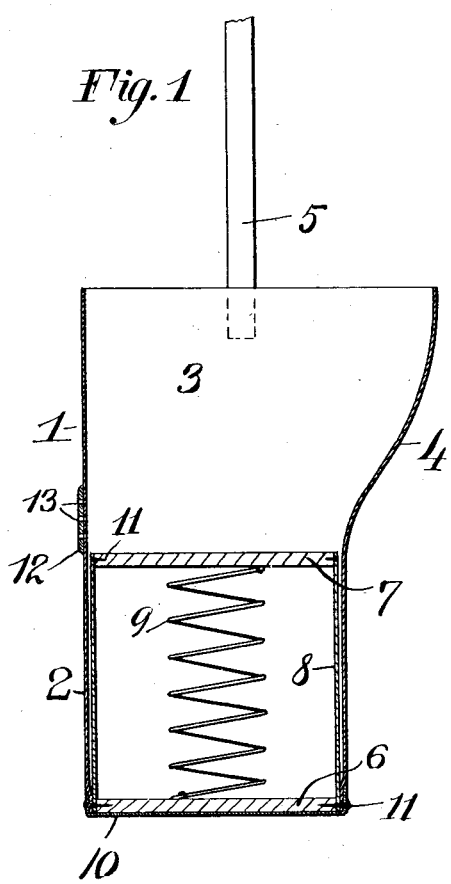
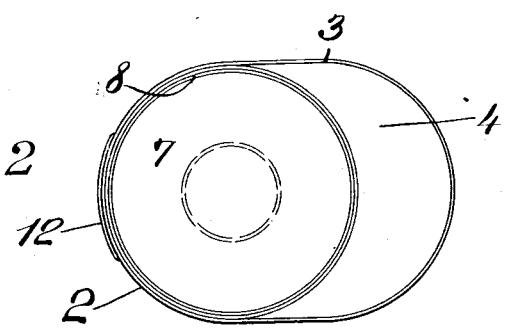
Witnesses:
Harry Klenert  Inventor
By his Attorney ns, 
UNITED STATES PATENT OFFICE.

HARRY KLENERT, OF NEW YORK, N. Y.

HORSE FEED-BAG.

1,064,745.  Specification of Letters Patent. Patented June 17, 1913.

Application filed December 23, 1912. Serial No. 738,173.

*To all whom it may concern:*

Be it known that I, HARRY KLENERT, a citizen of the United States of America, and a resident of the city, county, and State of New York, have invented certain new and useful Improvements in Horse Feed-Bags, of which the following is a specification.

This invention relates to feed bags particularly for horses and the object of the invention is to provide a feed bag of simple practical and inexpensive construction containing means for automatically elevating the feed toward the mouth of the horse as the feed is consumed, thereby preventing accidental loss of the feed which is common, incident to the jerking of the animal's head to enable it to reach the feed.

Other objects will appear as this specification proceeds, reference being had to the accompanying drawing in which—

Figure 1 is a central sectional view of a feed bag embodying my invention. Fig. 2 is a plan view thereof.

The reference numeral 1 denotes the bag which comprises a lower cylindrical portion 2 and an upper oblong mouth 3 formed with a curve 4 corresponding to the shape of the horse's head to permit the bag to be easily fastened to the head by means of the strap 5 and in the usual manner. The shape of the mouth 3 is such that it does not inconvenience the animal. The shorter diameter of the mouth is equal to the diameter of the cylinder 2 as seen in Fig. 2. Within the cylinder 2 the feed elevating device is placed. It comprises a fixed and a false bottom 6 and 7 respectively and which are connected by the cylinder 8. A spring 9 tends to elevate the false bottom 7.

The bag 1 and the cylinder 8 are usually made of a good grade of canvas and the bottoms 6 and 7 may be made of wood. The double layer of canvas at the bottom is confined between the bottom 6 and an outer covering 10 preferably of leather or similar material and the parts are secured together by tacks 11 or other securing means.

12 represents a reinforcing leather piece which is apertured to provide air holes 13 leading to the interior of the bag. The air holes 13 will preferably be placed so as to clear at all times the feed elevating device.

When in use the spring 9 will be compressed by the weight of the feed and as the latter is consumed the spring gradually and automatically elevates the feed which rests on the false bottom 7 in an obvious manner.

The construction as illustrated and described possesses several advantages. It is not expensive to make. It fulfils its purpose in a simple manner. There is no danger of the spring forcing the feed out of the bag as the movement of the spring is limited by the cylinder 8 which latter will preferably be made to fold inwardly as the feed depresses the bottom 7. It serves also as a protecting means for the spring as will be understood.

The device may be easily cleaned by turning the bag down over it. The spring 9 may be secured in any suitable manner to the bottoms 6 and 7.

I claim:

A feed bag comprising a lower cylindrical portion and an upper oblong mouth portion which flares to the one side of the said cylindrical portion, a feed elevating device contained within said cylindrical portion and comprising a false bottom adapted to receive the feed, a cylindrical covering secured to said false bottom, a fixed bottom, means for securing said covering and said cylindrical bag portion to the said fixed bottom and a spring between the said two bottoms and within the said cylindrical covering.

Signed at New York, N. Y., this 19 day of Dec. 1912.

HARRY KLENERT.

Witnesses:
 IVAN KONIGSBERG,
 AUGUSTA PSCHIERER.

---

Copies of this patent may be obtained for five cents each, by addressing the "Commissioner of Patents. Washington, D. C."